United States Patent
Lundrigan et al.

(10) Patent No.: US 8,282,058 B2
(45) Date of Patent: Oct. 9, 2012

(54) MOUNT WITH SEPARATE DEVICE INTERFACE

(75) Inventors: Shannon Lundrigan, Alberta (CA); Matko Papic, Alberta (CA)

(73) Assignee: Evans Consoles Corporation, Calgary (CA)

( * ) Notice: Subject to any disclaimer, the term of this patent is extended or adjusted under 35 U.S.C. 154(b) by 0 days.

(21) Appl. No.: 12/825,980

(22) Filed: Jun. 29, 2010

(65) Prior Publication Data

US 2010/0327134 A1 Dec. 30, 2010

Related U.S. Application Data

(60) Provisional application No. 61/221,264, filed on Jun. 29, 2009.

(51) Int. Cl.
*A47B 96/06* (2006.01)

(52) U.S. Cl. ......... 248/220.22; 248/220.42; 248/222.14; 403/408.1

(58) Field of Classification Search ............. 248/220.22, 248/220.31, 220.41, 220.42, 220.43, 222.14; 403/403, 408.1
See application file for complete search history.

(56) References Cited

U.S. PATENT DOCUMENTS

| | | | | |
|---|---|---|---|---|
| 444,161 A | | 4/1984 | Gibitz | |
| 466,259 A | | 5/1987 | Garfinkle | |
| 4,662,593 A | * | 5/1987 | Shames et al. | 248/222.14 |
| 4,674,721 A | * | 6/1987 | Thalenfeld | 248/220.22 |
| 4,697,774 A | * | 10/1987 | Sarton et al. | 248/220.22 |
| 5,188,326 A | * | 2/1993 | Zich | 248/220.41 |
| 5,865,562 A | * | 2/1999 | Mallek | 403/403 |
| 6,481,678 B1 | * | 11/2002 | Chong | 248/220.42 |
| 674,916 A1 | | 6/2004 | Will et al. | |
| 6,986,489 B2 | | 1/2006 | Oddsen | |
| 707,737 A1 | | 7/2006 | Moran | |
| 722,897 A1 | | 6/2007 | Perkins et al. | |
| 727,320 A1 | | 9/2007 | Carnevali | |
| 7,455,271 B2 | * | 11/2008 | Pincek et al. | 248/288.31 |
| 8,020,821 B2 | * | 9/2011 | Chen et al. | 248/220.22 |
| 2004/0118986 A1 | * | 6/2004 | Will et al. | 248/220.22 |
| 2004/0155161 A1 | * | 8/2004 | Yeh | 248/220.22 |
| 2007/0145230 A1 | | 6/2007 | Van Den Bossche et al. | |
| 2008/0105636 A1 | | 5/2008 | Lawson | |
| 2008/0105637 A1 | | 5/2008 | Lawson | |
| 2008/0149796 A1 | | 6/2008 | Moscovitch | |

OTHER PUBLICATIONS

Chief; KSG110; Installation Instructions; Universal Slat Wall Dual Arm Mounts; Chief Manufacturing; Aug. 2007.
http://www.pumadarts.com/shop/Dartboard+Accessories/-DB2303.html; accessed May 20, 2010.

* cited by examiner

*Primary Examiner* — Bradley Duckworth
(74) *Attorney, Agent, or Firm* — Notaro, Michalos & Zaccaria P.C.

(57) ABSTRACT

The present invention relates to mounting devices, and in particular to a mount for mounting a device or other object on a suitable support structure such as a slatwall. In one embodiment, the mount comprises a support structure interface engageable with a support structure, the support structure interface comprising a base having a first side and a second side opposite the first side, and at least one engagement member extending from the first side for engaging the support structure, and a mounting slot at the second side of the base. The mount further comprises a separate device interface comprising at least one male portion receivable into the mounting slot of the support structure interface and at least one connector portion connectable to a device that is to be mounted.

27 Claims, 4 Drawing Sheets

MOUNT WITH SEPARATE DEVICE INTERFACE

CROSS-RELATED APPLICATION

The present application claims priority under Title 35, §U.S.C. 119(e) on U.S. provisional application No. 61/221,264, filed Jun. 29, 2009, which is incorporated here by reference.

FIELD

The present invention relates to mounting devices, and in particular to a mount for mounting a device or other object on a suitable support structure such as a slatwall.

BACKGROUND

Various mounting structures and systems are known in the art. These include but are not limited to slatwalls, perforated walls, pegboards, wall tracks, rail panels, racks, rails and the like. For example, a slatwall is adapted to removably support one or more objects, and typically comprises a surface having a plurality of substantially parallel and regularly spaced tracks or grooves therein. The grooves are adapted to receive and retain support members, such as hooks, brackets, or other engagement members. The parallel grooves can run in any desired direction, but it is common for them to run in a horizontal direction. One advantage of a slatwall system is its versatility. It allows a user to position and reposition one or more objects on the slatwall in any desired arrangement.

A device, accessory or other object that is to be supported on a slatwall can be specially built to engage a slatwall. Alternatively, the object can be connected to a separate mount or bracket that is adapted to engage a slatwall.

Slatwalls are used in a multitude of different fields and applications for a variety of purposes. For example, slatwalls are used in retail store shelving and display units. They are also employed in commercial and personal storage systems, wherein any number of hangers, brackets or storage containers can be mounted on a slatwall. Slatwall systems are also used for mounting equipment and accessories in offices, homes, laboratories, workshops and vehicles. Examples of such equipment include but are not limited to electronics such as computers, displays, and input devices; laboratory equipment; and other accessories such as lamps, shelves and containers.

Slatwall mounts and brackets for supporting one or more objects on a slatwall are also known in the art. One type of slatwall bracket is a simple bracket comprising a hook or a flange extending upwardly from a base member. Another support member such as a rod, hook, or shelf may extend outwardly from the base to support one or more objects. Such a bracket is typically installed on a slatwall by inserting the hook or flange into an upwardly extending groove in the slatwall and rotating the bracket towards the slatwall until the base bears against the front surface of the slatwall. The bracket is removed by pulling the base member away from the slatwall and withdrawing the hook or flange from the groove. Such brackets are generally simple in construction and are typically easy to install and remove from the slatwall. However, these simple brackets are generally not suitable where a more secure engagement between the bracket and the slatwall is desired, or where the one or more objects to be supported on the slatwall are particularly heavy.

Another type of slatwall mount is one that is integrally formed with or otherwise fastened to the device or object to be supported on the slatwall. With such a mount, the device or object must be lifted and positioned at the slatwall. The device or object must then be accurately positioned relative the slatwall such that the one or more slatwall engagement members (e.g. hooks, flanges, etc.) on the mount align with and then engage one or more grooves in the slatwall. This installation and alignment procedure can be difficult if the device or object being mounted is sufficiently large that it obscures the installer's view of the engagement member(s) and the individual slatwall grooves. In such a case, the installer may have difficulty positioning the slatwall engagement members of the mount at the desired grooves of the slatwall, and therefore the device may not be installed in the desired location on the slatwall. Similarly, the installation and alignment procedure can also be challenging if the device or object is particularly heavy as the one or more installers may have difficulty accurately positioning the heavy load at the desired slatwall grooves.

In addition, many existing slatwall mounts and brackets are not suited for supporting heavy loads. This may be due to any number of reasons, including insufficient strength and rigidity of the slatwall engagement member(s) or the mount base or housing.

Many existing devices and other objects that are designed for use in combination with a slatwall are constructed with an integrally formed slatwall mount. Other devices that do not have an integrally formed mount may be fastened to a stand-alone mount. In the case where a first mounted device needs to be quickly dismounted and replaced with a second device, a second mount will need to have been already fastened to the second device to allow the second device to be mounted immediately after the dismounting of the first device. The alternative, which is typically much slower, is to dismount the first device, unfasten the mount from the first device, fasten the mount to the second device, and mount the second device on the slatwall. In addition, the provision of a mount for each device may not be an issue where the mounts are relatively inexpensive. However, where the mounts are expensive, whether it be due to the complexity of the mount, the strength and rigidity of the mount, or for whatever other reason, it is not desirable to have a separate mount for every device that may need to be mounted.

Moreover, in certain applications it is desirable that the mount be securely connected to the slatwall to prevent partial or complete disengagement of the mount. For example, a secure engagement may be desirable where the slatwall system is installed in or on a vehicle, or is installed in any other environment that is exposed to vibrations or other movements. A secure engagement may also be desirable where there is a concern that the object could be inadvertently disengaged from the slatwall. For example, this could be the case where the object to be mounted is large, heavy, fragile or expensive. In addition, a secure engagement may be desirable where the object is not to be readily or easily removed from the slatwall by unauthorized persons.

For the foregoing reasons, it can be appreciated that a need exists for slatwall mount that allows for safe, accurate and quick installation and repositioning of a device or other object on a slatwall. A need also exists for a mount that is strong and rigid, and can support heavy loads. There is also a need for a multi-part mount that does not necessitate a complete mount for every device that may be mounted on a slatwall. A further need exists for a slatwall mount that may be securely connected to a slatwall in order to prevent one or both of an inadvertent disengagement and an intentional disengagement by an unauthorized person of the mount from the slatwall.

SUMMARY

The present disclosure provides a mount that addresses many of the shortcomings described above.

According to the present invention then, there is provided a mount for mounting a device on a support structure, the mount comprising a support structure interface engageable with the support structure, the support structure interface comprising a base having a first side, a second side opposite the first side, and means for engaging the support structure on the first side; and at least a first wall and a second wall opposite and spaced apart from the first wall, the at least first and second walls defining a mounting slot at the second side of the base and having at least an open top, the first wall being disposed between the at least one engagement member and the second wall, the second wall defining a slit providing communication between the mounting slot and an external environment of the mounting slot through the second wall, the slit extending in a longitudinal direction of the mounting slot from a top edge of the second wall adjacent the open top of the mounting slot; and a device interface comprising at least one male portion receivable into the mounting slot through the open top, the male portion comprising a guide portion for engaging the slit of the mounting slot to guide and locate the male portion in the mounting slot; and at least one connector portion connectable to the device.

BRIEF DESCRIPTION OF THE DRAWINGS

Preferred embodiments of the present invention will now be described in greater detail and will be better understood when read in conjunction with the drawings in which.

DETAILED DESCRIPTION

Figure 1:
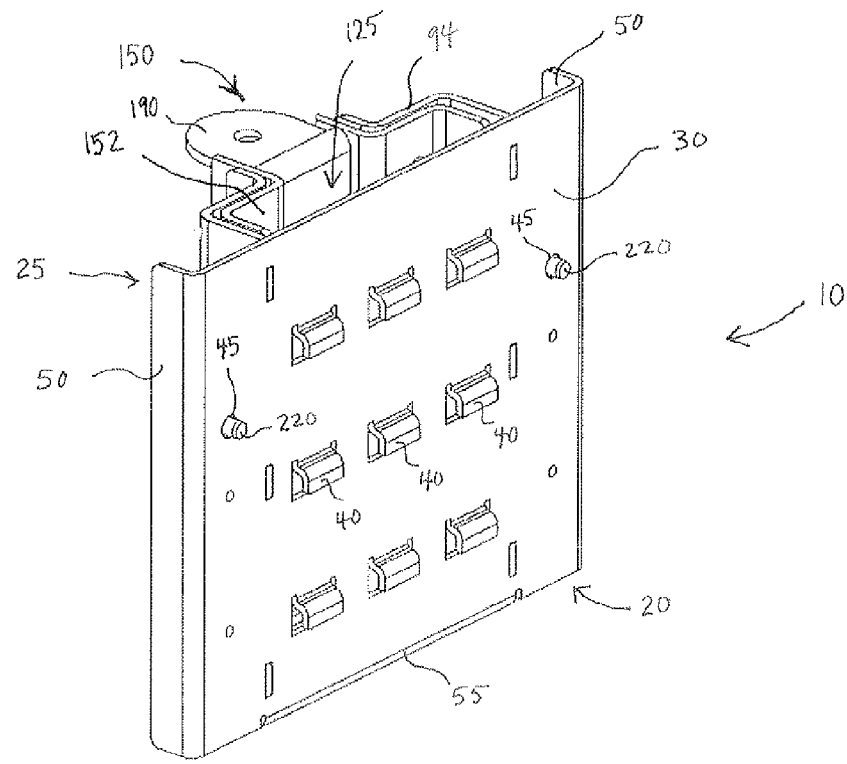
FIG. 1 is a perspective view of one embodiment of the present mount showing the slatwall engaging side of the mount.

The present mount is described in one embodiment in the following disclosure with reference to the Figures. While this embodiment is described in the context of a mount adapted for engagement with a slatwall, the scope of the present disclosure is not intended to be limited to mounts for slatwalls. The present mount can be used in combination with other types of suitable mounting surfaces and other suitable structures, including but not limited to perforated walls, pegboards, wall tracks, rail panels, racks, and rails.

The various features and components of the present mount are now described with reference to the Figures.

The mount of the present invention generally comprises a support structure interface and a device interface. Having reference to FIGS. 1 and 2, one embodiment of mount 10 comprises a support structure interface in the form of a slatwall interface 20, and a device interface 150, the latter being slidably engageable with the slatwall interface 20. Slatwall interface 20 has a base 25 comprising one or more engagement members 40 for engaging a slatwall. It will be appreciated, however, that in at least one other embodiment adapted for engagement with a non-slatwall support structure, the support structure interface need not comprise one or more engagement members. For example, in one embodiment, support structure interface could comprise one or more mounting holes and support structure interface could be fastened to a support structure using one or more fasteners. Those skilled in the art will appreciate that other types and forms of engagement or connections means are possible, including but not limited to hooks, clamps, straps, and fasteners, Slatwall interface 20 also defines a mounting slot 125 for receiving a male portion 152 of device interface 150. Device interface 150 also comprises at least a first connection portion 190 for connection to a device that is to be mounted on the slatwall. Although the term "device" is used herein, it is not intended to limit the type of object that may be mounted with the present mount. Therefore the word "device" shall be understood to encompass any type of object or objects.

Figure 3:
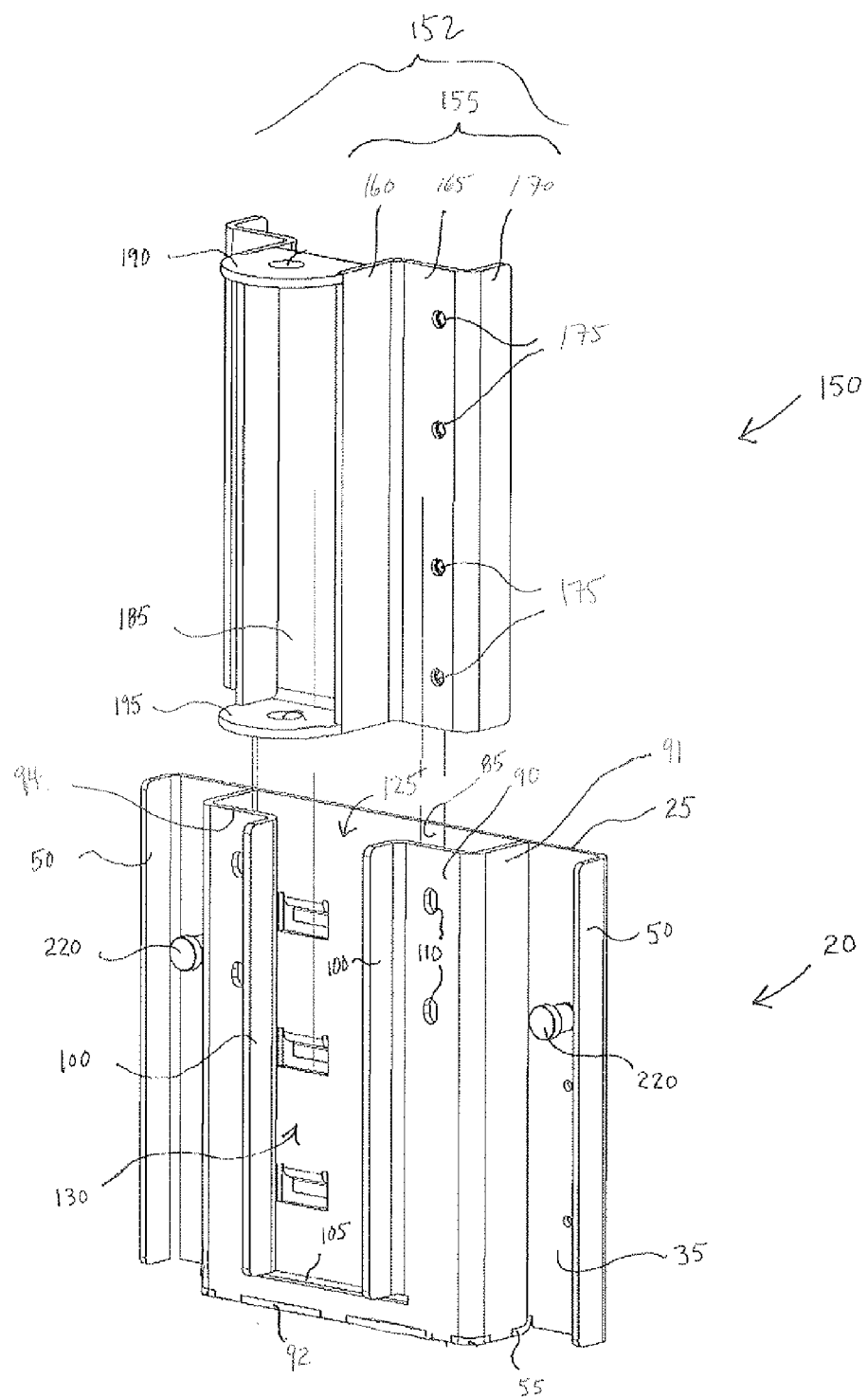
FIG. 3 is perspective view of the mount shown in FIG. 1 with the device interface completely disengaged from the slatwall interface.
Figure 4A:
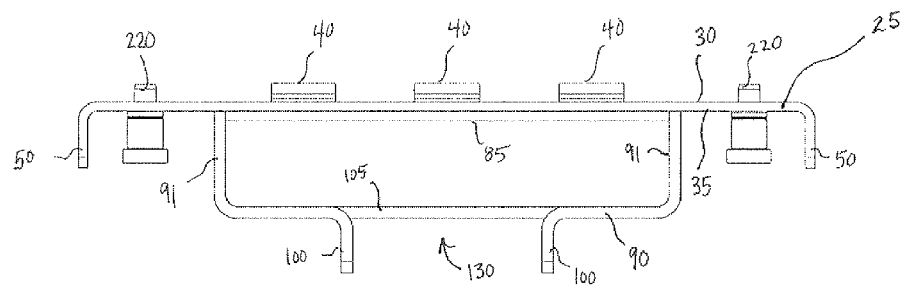
FIG. 4A is top view of the slatwall interface of the mount.
Figure 4B:
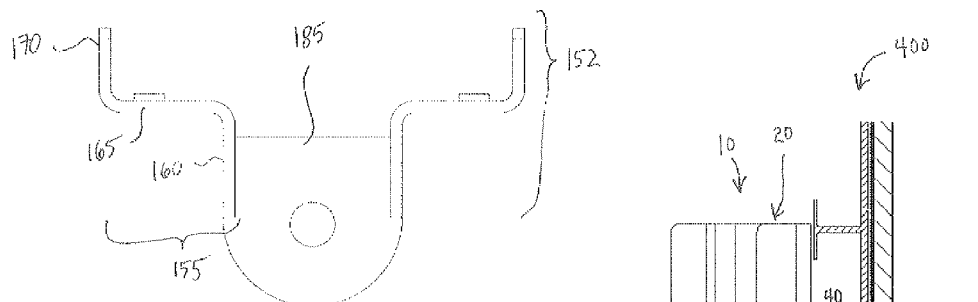
FIG. 4B is top view of the device interface of the mount.

Having reference now to FIGS. 3, 4A and 4B, the slatwall interface 20 and the device interface 150 of one embodiment of mount 10 are described in more detail. FIGS. 4A and 4B show top views of slatwall interface 20 and device interface 150, respectively. It will be appreciated by those skilled in the art that this embodiment is merely an example and that various other embodiments are possible.

Slatwall interface 20 comprises a base 25 having a first side 30 and a second opposing side 35. These two sides are best seen in FIG. 4A. Base 25 may be in the form of a plate, and can be made of any suitable material known in the art, including metal. When slatwall interface 20 in installed on the slatwall, it is first side 30 of base 25 that faces the slatwall. In addition, at least one engagement member 40 protrudes from first side 30 for engagement with a surface of a slatwall. The load capacity of mount 10 may be increased by providing a plurality of engagement members 40 to distribute the load supported by mount 10 across the mount itself as well as across the slatwall. Where base 25 comprises multiple engagement members 40, two or more members can be aligned in a single row to distribute the load about a single slat or groove of a slatwall. Two or more members can also be aligned to form multiple rows, thereby distributing the load about multiple slats or grooves of a slatwall. For example, the embodiment of mount 10 shown in the Figures has a three by three array of engagement members 40.

Figure 5:
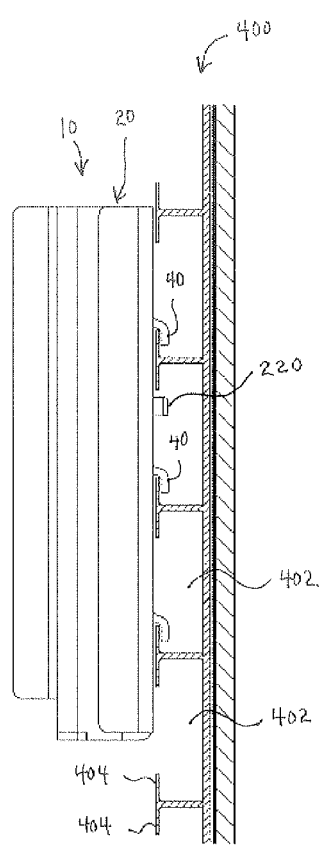
FIG. 5 is side view of the mount shown in FIG. 1 installed on a slatwall.

As will be appreciated by those skilled in the art, each engagement member 40 will be suitably shaped to engage a slat or groove of a slatwall. In one embodiment, as shown in FIG. 5, a proximal portion of engagement member 40 extends outwardly from base 25 and a distal portion of the engagement member extends downwardly from the proximal portion, in effect forming a hook-like structure to engage a lip 404 of a slatwall 400. Furthermore, engagement members 40 of the embodiment shown in the Figures are integrally formed with base 25, which is shown in the form of a plate. In one embodiment, as shown in FIG. 1, the one or more engagement members 40 can be punched out of the plate. However, in an alternative, the one or more engagement members 40 can be welded, fastened, or otherwise connected to or formed with base 25. Furthermore, the particular type and shape of engagement member shown in the Figures and described herein is only meant as an example and is not meant to limit the scope of the present disclosure. Other types and forms of engagement members for engaging a slatwall will be apparent to those skilled in the art.

As shown in FIGS. 3 and 4A, the lateral sides 50 of base 25 can be angled or bent from a central portion of the base to improve the strength and rigidity of the base. In addition, one or more holes 45 may be formed in or through base 25. The one or more holes 45 can be used to receive securing hardware 220 for preventing inadvertent disengagement of slatwall interface 20 from the slatwall. In one embodiment, as shown best in FIG. 1, holes 45 can be located in the central portion of base 25 proximate the inner sides of lateral edges 50. The engagement of mount 10 on a slatwall and the use of securing hardware 220 will be described in more detail below.

Furthermore, base 25 can be formed with a tab portion 55 at its lower edge, which can form a bottom wall 92 of mounting slot 125. In the case where base 25 is made of a bendable material, such as metal, tab 55 can be bent to relative the base until it is at a suitable angle to form a bottom wall. Bottom wall 92 of mounting slot 125 is described in more detail below.

Figure 2:
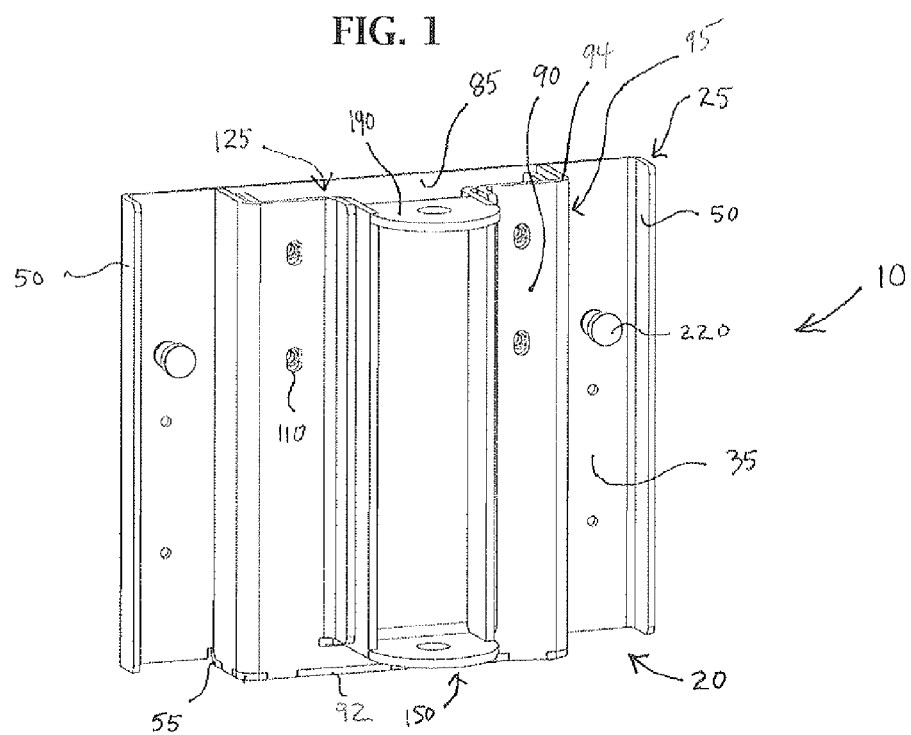
FIG. 2 is a perspective view of the opposite side of the mount shown in FIG. 1.

Slatwall interface 20 also defines a mounting slot 125 for receiving at least a portion of device interface 150. Mounting slot 125 is positioned on second side 35 of base 25, that is to say on the opposite side of the base from which the one or more engagement members 40 protrude. As best shown in FIG. 3, mounting slot 125 is formed at least by spaced-apart first and second walls 85 and 90, respectively. First wall 85 is positioned opposite second wall 90 with first wall 85 being disposed between the one or more engagement members 40 and second wall 90. In addition, as shown in FIGS. 1 to 3, base 25 may form first wall 85. However, in an alternative, first wall 85 may be a separate wall and would be generally positioned adjacent or proximate base 25. One such alternative is shown in FIG. 4A, in which first wall 85 is a separate wall from base 25.

With reference to FIGS. 3 and 4A, second wall 90 is spaced apart from first wall 85 to create a gap or opening, which forms mounting slot 125. The top of mounting slot 125, which is defined by the top edges 94 of at least first and second walls 85 and 90, respectively, is unobstructed to receive male portion 152 of device interface 150. Since male portion 152 of device interface is received into mounting slot 125 via its open top, male portion 152 is generally retained within the mounting slot by gravity.

Mounting slot 125 may also be defined by one or more side walls 91. In the embodiment shown in the Figures, the sides of second wall 90 extend at an approximately ninety-degree angle from the central portion of wall 90 towards base 25 to form side walls 91. Side walls 91 can be connected to base 25 to brace and support second wall 90 relative to base 25. Furthermore, as shown in FIG. 4A, side walls 91 give mounting slot 125 a substantially rectangular cross section. In addition, mounting slot 125 can be further defined by a bottom wall 92. In one embodiment, as best shown in FIGS. 2 and 3, bottom wall 92 can be formed by tab 55 extending at an angle from the bottom edge of base 25.

Furthermore, as best shown in FIGS. 3 and 4A, second wall 90 of slatwall interface 20 also defines a slit 130 providing communication between mounting slot 125 and the external environment of the mounting slot. Slit 130 extends from top edge 94 of second wall 90 in the longitudinal direction of mounting slot 125. In the embodiment shown in the Figures, slit 130 extends from top edge 94 just about to the bottom edge of second wall 90. The bottom of slit 130 is defined by a lower inner edge 105 of second wall 90. In one embodiment, a portion of device interface 150 at or near its bottom end can bear against lower inner edge 105 of slit 130 to prevent device interface 150 from sliding any further into mounting slot 125. In another embodiment, device interface 150 could bear against bottom wall 92 of mounting slot 125. In addition, the portion of mounting slot 125 located between bottom 92 of the mounting slot and edge 105 supports the opposing second walls 90 and helps prevent slit 130 from spreading open under load. Furthermore, the opposing longitudinal inner edges wall 90 at slit 130 can be outwardly flared to form flanges 100. Flanges 100 can support and position device interface 150 within mounting slot 125.

In addition, at least one of the walls defining mounting slot 125 can comprise one or more holes 110. As will be described in more detail below, each of these one or more holes 110 can be adapted to receive a fastener, pin or other suitable obstruction member for selectively securing device interface 150 within mounting slot 125.

As previously mentioned, in addition to a slatwall interface 20, the slatwall mount comprises a device interface 150, which has at least a male portion 152 and a first connection portion 190. Male portion 152 is sized and shaped to be receivable into mounting slot 125 but is still freely slidable within the slot. In at least one embodiment, male portion 152 will be dimensioned such that it fits snugly into mating slot 125. Male portion 152 also comprises at least one guide portion for engaging slit 130 of mounting slot 125 to guide and locate male portion 152 within the slot.

Figure 6:
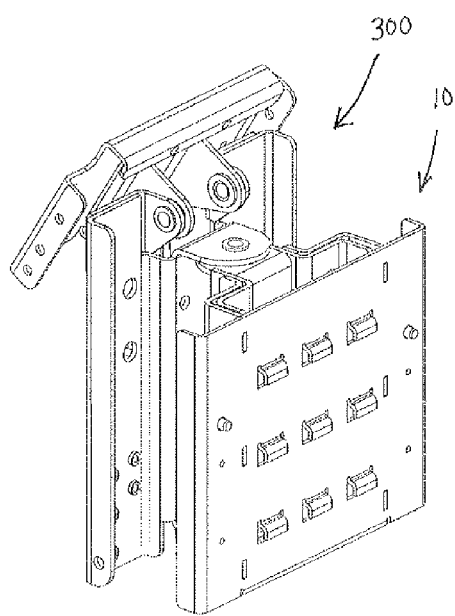
FIG. 6 is perspective view of the mount shown in FIG. 1 coupled to a secondary mount.
Figure 7:
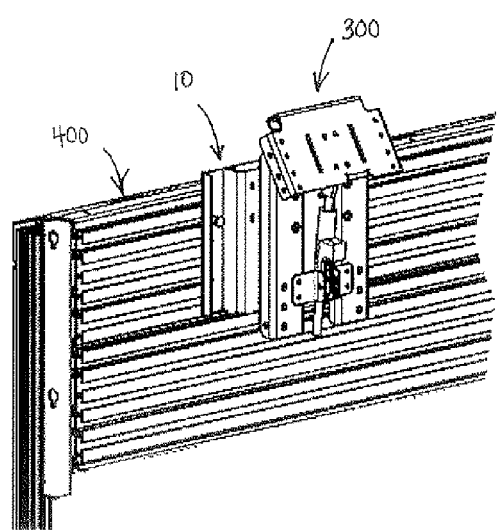
FIG. 7 is perspective view of the mount and secondary mount shown in FIG. 6 installed on a slatwall.

Again having reference to FIGS. 3 and 4B, device interface 150 of one embodiment of mount 10 is now described. Male portion 152 comprises a pair of wings 155 that are joined by a joining portion 185. As best shown in FIG. 4B, each wing 155 has central portion 165, and proximal and distal portions, 160 and 170 respectively, which extend in opposite directions from opposite ends of central portion 165. Proximal portions 160 of each wing are joined by joining portion 185. In this embodiment, proximal portions 160 of wings 155 serve as guide portions for engaging flanges 100 at slit 130 to guide and locate male portion 152 in mounting slot 125. As shown in FIG. 3, device interface 150 also has first and second connection portions 190 and 195, respectively, which are in the form of semi-circular tabs that extend from opposite ends of interface 150. Connection portions 190 and 195 may each have a hole therethrough for receiving some form of connector for connecting or otherwise coupling a device to device interface 150. For example, a device or a bracket fastened to a device could have corresponding connection tabs, which could be bolted or otherwise connected to tab connection portions 190 and 195. Such a configuration is shown in FIGS. 6 and 7, in which a secondary mount 300 is connected to slatwall mount 10. FIG. 7 shows mount 10 installed on a slatwall 400 and supporting secondary mount 300. It will be appreciated by those skilled in the art that tab connection portions 190 and 195 are merely one way by which a device may be connected or otherwise coupled to device interface 150, and that various other means of connecting a device to device interface 150 are possible.

In addition, device interface 150 can also comprise one or more holes 175 that may be used for selectively securing device interface 150 to slatwall interface 20. The one or more holes 175 can receive a fastener, pin or other suitable obstruction member for locking interface 150 relative slatwall interface 20. For example, one or more holes 175 can be located in male portion 152 and are positioned such that they align with holes 110 in slatwall interface 20 when male portion 152 is fully inserted or engaged with mounting slot 125.

As best shown in FIG. 3, the one or more holes 175 can be located in one or both of wings 155 of device interface 150.

FIG. 2 shows device interface 150 engaged with slatwall interface 20, with holes 175 being in alignment with holes 110 in second wall 90 of slatwall interface 20. A fastener, pin or other obstruction member (not shown) can be inserted through hole 110 into hole 175 to lock or retain male portion 152 of device interface 150 within mounting slot 125. In at least one embodiment, the one or more holes 175 can be threaded to receive a threaded fastener, such as a bolt or screw. In an alternative, rather than threading the actual one or more holes 175, each hole can be fitted with a self-clinching nut. One type of self-clinching nut is a PEM™ self-clinching nut and is made by Penn Engineering™, which is headquartered in Danboro, Pa., U.S.A. This type of self-clinching nut is typically fitted to a hole by placing the nut at or in the hole and applying a press force to the head of the nut.

The one or more fasteners, pins or other obstruction members that may be used to secure device interface 150 to slatwall interface 20 can be of the tool-less type, meaning that they can be engaged or disengaged manually without requiring the use of any tools. For example, in the case of a threaded connection, a wing bolt or wing screw could be used. Alternatively, the one or more fasteners, pins or other obstruction members can be of the type that requires a tool for their engagement and disengagement, such as standard bolts and screws. Specialized anti-tampering or anti-theft hardware could also be used. An example of this type of hardware is a bolt or screw having an irregularly shaped head where the bolt or screw can generally only be turned using a special tool. In addition to the aforementioned types of hardware, those skilled in the art will appreciate that other types of suitable hardware could also be employed.

Furthermore, in at least one embodiment, male portion 152 of device interface 150 can be adapted to be receivable into mounting slot 125 in more than one orientation. For example, in the embodiment shown in the Figures, male portion 152 is substantially symmetrical about a bisecting plane that is perpendicular to the longitudinal axis of male portion 152. In other words, the plane bisects male portion 152 at the midway point of its length. This symmetry allows male portion 152 to be inserted into mounting slot 125 by either of its two ends. In addition, the one or more holes 175 in male portion 152 can be positioned such that at least one of holes 175 aligns with at least one of the corresponding holes 110 in slatwall interface 20 when male portion 152 has been inserted into mounting slot 125. For example, as best shown in FIGS. 2 and 3, four of the eight holes 175 in male portion 152 align with the four holes 110 in slatwall interface 20 regardless of which end of male portion 152 is inserted first into mounting slot 125. Such a configuration allows device interface 150 and any device connected thereto to be installed onto slatwall interface 20 in one of two orientations.

The installation, removal and use of slatwall mount 10 will now be described. One option for installing mount 10 on a slatwall involves first installing slatwall interface 20 on the slatwall. Device interface 150 is then installed on slatwall interface 20 by sliding male portion 152 of device interface 150 into mounting slot 125.

As mentioned above, when slatwall interface 20 comprises one or more holes 45 in base 25, securing hardware 220 can be used to secure slatwall interface 20 to a slatwall. In at least one embodiment, securing hardware 220 can be used as an obstruction to prevent the one or more engagement members 40 from disengaging the slatwall. For example, FIG. 5 shows one way by which securing hardware 220 can obstruct the removal of slatwall interface 20 from slatwall 400. In the embodiment shown, slatwall interface 20 is installed on slatwall 400 by positioning interface 20 proximate slatwall 400 and then moving interface 20 slightly downward to engage engagement members 40 with slatwall lips 404. To secure slatwall interface 20 to the slatwall, securing hardware 220 is screwed or otherwise moved through hole 45 in base 25 towards the slatwall until securing hardware 220 extends into one of slatwall grooves 402 and is positioned under one of the slatwall lips 404. As the removal of slatwall interface 20 from slatwall 400 is achieved by lifting slatwall interface 20 in an upward direction, securing hardware 220 prevents slatwall interface 20 from being lifted and thereby prevents the disengagement of engagement members 40 from slatwall lips 404. When the time comes to remove slatwall interface 20 from the slatwall, securing hardware 220 is moved in the opposite direction, meaning away from the slatwall, which in turn allows slatwall interface 20 to be lifted upward and disengaged from the slatwall.

Securing hardware 220 can be any suitable hardware known in the art. For example, in one embodiment, securing hardware 220 can be in the form of a spring-loaded plunger. One type of spring-loaded plunger generally has a housing, a plunger that is slidably engaged with the housing, and a biasing member to bias the plunger relative the housing. The plunger is typically lockable in at least one position. An example of this type of spring-loaded plunger is a "spring loaded plunger assembly" made by Penn Engineering™. However, it will be appreciated by those skilled in the art that other types of hardware can be used, including but not limited to screws and bolts. It will be further appreciated that the securing hardware can be of the tool-less type, such as for example thumb screws, or can be of the type that requires the use of a tool. Moreover, the securing hardware can also be of the anti-tampering or anti-theft type, both of which were described above.

In addition to the step of securing slatwall interface 20 to a slatwall, the device interface 150 may also be secured to slatwall interface 20. The securing of device interface 150 to slatwall interface 20 was also described above.

The various components of mount 10 can be made of any suitable material or materials known in the art. In at least one embodiment, one or more of the components will be made of metal. In at least one embodiment, one or more of the components will be made of sheet metal. Furthermore, it has been determined that a mount made of 10 gauge sheet steel can generally support a device weighing up to 300 pounds (136 kg).

The previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A mount for mounting a device on a support structure, the mount comprising:
    a support structure interface engageable with the support structure, the support structure interface comprising:
        a base having a first side, a second side opposite the first side, and means for engaging the support structure on the first side; and
        at least a first wall and a second wall opposite and spaced apart from the first wall, the at least first and second walls defining a mounting slot at the second side of the base and having at least an open top, the first wall being disposed between the engagement means and the second wall, the second wall defining a slit providing communication between the mounting slot and an external environment of the mounting slot through the second wall, the slit extending in a longitudinal direction of the mounting slot from a top edge of the second wall adjacent the open top of the mounting slot,
        wherein the support structure interface defines at least one hole therethrough providing communication into the mounting slot from the second side of the base; and
    a device interface comprising:
        at least one male portion receivable into the mounting slot through the open top, the male portion comprising a guide portion for engaging the slit of the mounting slot to guide and locate the male portion in the mounting slot, wherein the male portion has a first end and a second end, and wherein the male portion is receivable into the mounting slot in a first orientation in which the male portion is inserted into the slot first end first, and wherein the male portion is receivable into the mounting slot in a second orientation in which the male portion is inserted into the slot second end first; and
        at least one connector portion connectable to the device; and
    means for obstructing the removal of the male portion from the mounting slot, wherein the obstructing means is receivable through the at least one hole in the support structure interface into the mounting slot in a direction that is at least partially transverse to the direction of travel of the male portion in the mounting slot to block the travel of the male portion out of the mounting slot.

2. The mount of claim 1 wherein the male portion of the device interface defines at least one hole that is in substantial alignment with a one of the at least one holes in the support structure interface when the male portion is positioned in the mounting slot, the obstructing means being receivable into the at least one hole in the device interface thereby blocking the travel of the male portion out of the mounting slot.

3. The mount of claim 2 wherein a one of the at least one hole in the male portion is threaded to receive correspondingly threaded obstruction means.

4. The mount of claim 2 wherein a one of the at least one hole in the male portion is fitted with a self-clinching nut to receive threaded obstruction means.

5. The mount of claim 1 wherein the obstructing means is of the tool-less type.

6. The mount of claim 1 wherein the obstructing means is of the type that requires a tool for its disengagement.

7. The mount of claim 1 wherein the obstructing means is in the form of at least one spring-loaded plunger.

8. The mount of claim 1 further comprising securing hardware for selectively preventing the disengagement of the support structure interface from the support structure.

9. The mount of claim 1 wherein the base of the support structure interface defines at least one securing hole therethrough for receiving securing hardware for selectively preventing the disengagement of the support structure interface from the support structure.

10. The mount of claim 1 wherein the support structure is a slatwall, and the means for engaging the support structure is in the form of at least one slatwall engagement member.

11. The mount of claim 10 further comprising securing hardware for selectively preventing the disengagement of the support structure interface from the slatwall.

12. The mount of claim 11 wherein the base of the support structure interface defines at least one securing hole therethrough for receiving the securing hardware for selectively preventing the disengagement of the support structure interface from the slatwall.

13. The mount of claim 12 wherein a one of the at least one securing hole is positioned in the base such that when the support structure interface is engaged to the slatwall, the securing hardware can be inserted through the at least one securing hole towards the slatwall to prevent disengagement of the of at least one slatwall engagement member from the slatwall.

14. The mount of claim 13 wherein the slatwall comprises at least one slat having at least one lip projecting transversely from a first side of the slat, and wherein when the support structure interface is engaged to the slatwall the at least one slatwall engagement member engages the at least one lip and the at least one securing hole is located in the base such that the securing hardware extends on a second opposing side of the slat to limit movement of the support structure interface relative the slatwall to prevent the at least one slatwall engagement member from being disengaged from the at least one lip.

15. The mount of claim 13 wherein the securing hardware is of the tool-less type.

16. The mount of claim 13 wherein the securing hardware is of the type that requires a tool for its disengagement.

17. The mount of claim 13 wherein the securing hardware comprises at least one spring-loaded plunger.

18. The mount of claim 10 wherein when the support structure interface is mounted on the slatwall, the longitudinal axis of the mounting slot is substantially perpendicular to a slat of the slatwall.

19. The mount of claim 10 wherein when the support structure interface is mounted on the slatwall, the longitudinal axis of the mounting slot is substantially parallel to a slat of the slatwall.

20. The mount of claim 10 comprising a plurality of slatwall engagement members.

21. The mount of claim 20 wherein the slatwall comprises a plurality of slats, and when the support structure interface is engaged to the slatwall the plurality of slatwall engagement members engage at least two of the plurality of slats.

22. The mount of claim 20 wherein the slatwall comprises a plurality of slats, and when the support structure interface is engaged to the slatwall, at least two of the plurality of slatwall engagement members engage the same slat.

23. The mount of claim 10 wherein the at least one slatwall engagement member is integrally formed with the base of the support structure interface.

24. The mount of claim 1 wherein the base forms the first wall of the support structure interface.

25. The mount of claim 1 wherein the male portion is substantially symmetrical about a bisecting plane that is perpendicular to the longitudinal axis of the male portion.

26. The mount of claim 1 wherein at least a portion of the second wall that is adjacent the slit is flared outwardly from the mounting slot to define at least one support flange.

27. The mount of claim 1 wherein when the obstructing means are received into the mounting slot, the obstructing means are oriented in a substantially perpendicular direction to the direction of travel of the male portion within the mounting slot.

* * * * *